Patented Nov. 21, 1933

1,935,960

UNITED STATES PATENT OFFICE 1,935,960

METHOXY - HYDROXY - AMINO BENZENE ARSONIC ACID

Karl Streitwolf, Frankfort-on-the-Main, Alfred Fehrle, Bad Soden-on-the-Taunus, and Hans Hilmer, Frankfort-on-the-Main, Germany, assignors to Winthrop Chemical Company, Inc., New York, N. Y., a corporation of New York No Drawing. Application December 24, 1931, Serial No. 583,150, and in Germany January 10, 1931

3 Claims. (Cl. 260—14)

The present invention relates to organic arsenic compounds, more particularly to compounds of the following general formula

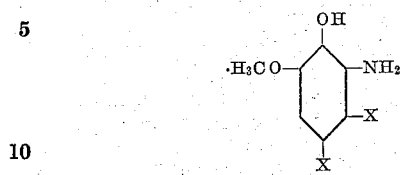

wherein one X represents the group $AsO_3H_2$, the other X represents hydrogen.

We have found that 1-methoxy-2-hydroxy-3-aminobenzene-arsonic acids can advantageously be used against protozoa diseases.

The new 1-methoxy-2-hydroxy-3-aminobenzene-arsonic acids can be obtained by reducing the corresponding 1-methoxy-2-hydroxy-3-nitrobenzene-arsonic acids which may be prepared according to known methods.

The reduction of the 1-methoxy-2-hydroxy-3-nitrobenzene-arsonic acids is preferably carried out by dissolving in water the acid in the form of an alkali salt, e. g. of its sodium salt, and adding sodium hydrosulfite to the solution thus obtained. By adding acetic acid, preferably glacial acetic acid, to this solution, the 1-methoxy-2-hydroxy-3-aminobenzene-arsonic acid precipitates in the form of its sodium salt.

The new preparations are only slightly poisonous when administered per os, but they have quite a good therapeutic action. The dosis tolerata of, for instance, 3-amino-4-hydroxy-5-methoxybenzene-1-arsonic acid per kilo of rabbit amounts to above 500 milligrams when administered per os. 25 milligrams will already cure the syphilis of rabbits, so that there is a chemotherapeutic index of more than 1/20. This could not be foreseen, since according to "Berichte der deutschen chemischen Gesellschaft", volume 47, 1914, page 996, the $CH_3O$-group is distherapeutic and the 2-methoxy-4-hydroxy-5-aminobenzene-1-arsonic acid mentioned in "Berichte der deutschen chemischen Gesellschaft", volume 48, 1915, pages 513 and 521, has no suitable action.

The following examples illustrate our invention:

1. 1-methoxy-2-hydroxy-3-nitrobenzene-5-arsonic acid is obtained from 5-nitro-2-acetyl-aminoanisol by exchanging the acetylamino group for hydroxyl, reducing the nitro group to the amino group, diazotizing the latter, substituting the arsonic acid radical for the diazo group and nitrating the 1-methoxy-2-hydroxybenzene-5-arsonic acid according to the following scheme:

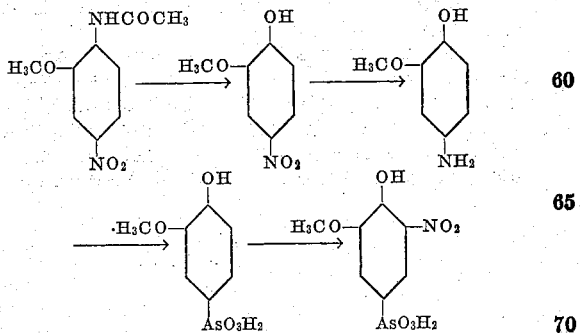

15 grams of the acid are dissolved in 150 cc. of water and 50 cc. of 10 N caustic soda solution. 35 grams of sodium hydrosulfite are added to the solution, while vividly stirring. The filtered solution is acidified with 31 cc. of glacial acetic acid, whereupon the 1-methoxy-2-hydroxy-3-aminobenzene-5-arsonic acid separates in the form of its sodium salt. By dissolving in hydrochloric acid and neutralizing the solution thus obtained until the reaction to Congo paper is neutral, the free acid of the following formula:

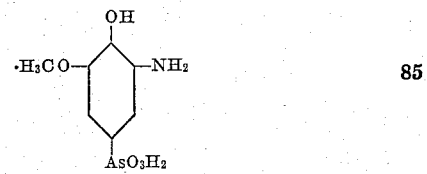

is obtained. The yield amounts to 70 to 75%. The 1-methoxy-2-hydroxy-3-aminobenzene-5-arsonic acid is soluble in alkalies and mineral acids and easily soluble in water, methyl alcohol and ethyl alcohol.

2. The 1-methoxy-2-hydroxy-3-aminobenzene-4-arsonic acid is obtained by starting from 1-methoxy-2-nitro-4-aminobenzene. The 1-methoxy-2-nitro-4-aminobenzene is diazotized in the usual manner and arseniated. The 1-methoxy-2-nitrobenzene-4-arsonic acid thus formed is reduced with the calculated quantity of hydrosulfite to the amino-acid and then acetylated. By nitrating the 1 - methoxy - 2 - acetylamino-4-arsonic acid, the 1-methoxy-2-acetylamino-3-nitrobenzene-4-arsonic acid is obtained according to the following scheme;

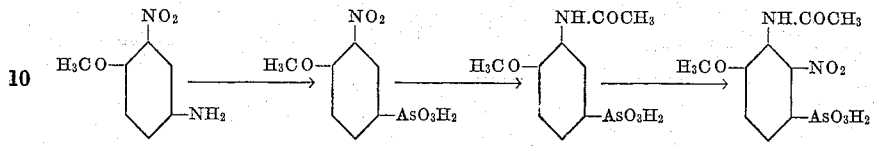

On treating this acid (10 grams) at 90° C.–95° C. with strong caustic soda solution (20 cc. of caustic soda solution of 45° Bé. and 10 cc. of water) there is split off at the same time the acetyl group and ammonia with formation of 1-methoxy-2-hydroxy - 3 - nitrobenzene - 4 - arsonic acid. The yield amounts to about 70% of the theory. By reducing by means of hydrosulfite, the 1-methoxy - 2 - hydroxy - 3 - aminobenzene-4-arsonic acid of the following formula:

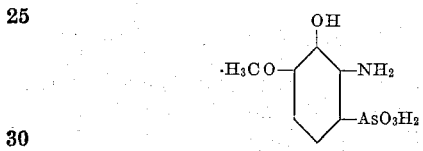

is obtained. It is soluble in alkali, mineral acids, water and methyl alcohol.

3. The 1-methoxy-2-hydroxy-3-aminobenbene-4-arsonic acid can also be prepared by starting from 1-methoxy-2 - acetylaminobenzene. This compound is nitrated, reduced, diazotized and caused in the usual manner to react with arsenious acid to produce 1-methoxy-2-acetylamino-4-arsonic acid. By nitrating this compound the nitro group enters the 2-position. The product is worked up to the 1-methoxy-2-hydroxy-3-aminobenzene-4-arsonic acid as indicated in the preceding examples.

We claim:

1. The compounds of the following formula

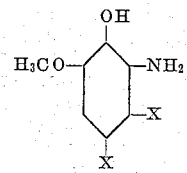

wherein one X represents the group AsO₃H₂, the other X represents hydrogen, said products having a good action against protozoa diseases.

2. The 1-methoxy-2-hydroxy-3-amino-5-benzene-5-arsonic acid, being soluble in alkali and in mineral acids, easily soluble in water, methyl alcohol and ethyl alcohol and having a good action against protozoa diseases.

3. The 1-methoxy-2 - hydroxy - 3 - aminobenzene-4-arsonic acid, being soluble in alkali and in mineral acids, in water and in methyl alcohol and having a good action against protozoa diseases.

KARL STREITWOLF.
ALFRED FEHRLE.
HANS HILMER.